(12) United States Patent
Gardes et al.

(10) Patent No.: US 8,237,413 B2
(45) Date of Patent: Aug. 7, 2012

(54) METHOD FOR BATTERY CHARGING MANAGEMENT

(75) Inventors: Florian Gardes, L'Isle d'Espagnac (FR); Antoine Juan, Champniers (FR); Serge Maloizel, Trois Palis (FR)

(73) Assignee: SAFT, Bagnolet (FR)

( * ) Notice: Subject to any disclaimer, the term of this patent is extended or adjusted under 35 U.S.C. 154(b) by 476 days.

(21) Appl. No.: 12/349,976

(22) Filed: Jan. 7, 2009

(65) Prior Publication Data

US 2009/0174368 A1    Jul. 9, 2009

(30) Foreign Application Priority Data

Jan. 8, 2008    (FR) ...................................... 08 00097

(51) Int. Cl.
*H02J 7/04*    (2006.01)

(52) U.S. Cl. ........................ 320/150; 320/144

(58) Field of Classification Search .................. 320/144, 320/150, 153
See application file for complete search history.

(56) References Cited

U.S. PATENT DOCUMENTS

| | | | |
|---|---|---|---|
| 5,363,031 A | 11/1994 | Miller et al. | |
| 2001/0001533 A1* | 5/2001 | Stuck Andersen et al. ... | 320/150 |
| 2002/0101218 A1* | 8/2002 | Koenck et al. ............... | 320/140 |
| 2003/0094927 A1 | 5/2003 | Pavlovic et al. | |

* cited by examiner

*Primary Examiner* — Vincent Q Nguyen
(74) *Attorney, Agent, or Firm* — Sughrue Mion, PLLC

(57) ABSTRACT

A method for managing the charge of a battery having at least one rechargeable electrochemical cell. A charging circuit applies a trickle charge current to the battery and, when the temperature of the battery is below a first threshold temperature, an overcharge current for keeping the battery within its nominal temperature range even if the battery is employed in a cold environment. And a related electronic system for a battery implementing the method and a battery employing such system.

11 Claims, 3 Drawing Sheets

METHOD FOR BATTERY CHARGING MANAGEMENT

BACKGROUND OF THE INVENTION

The present invention relates to a method for managing the charging of a battery comprising at least one storage cell and which is employed in cold environments. It additionally covers an electronic system for a battery, and a battery employing such system.

An electrochemical cell or rechargeable cell (these two terms being equivalent) is a device for producing electricity in which chemical energy is converted into electrical energy. The chemical energy is constituted by electrochemically active compounds deposited on at least one face of electrodes arranged in the cell. The electrical energy is produced by electrochemical reactions during discharge of the cell. The electrodes, arranged in a container, are electrically connected to current output terminals to provide electrical continuity between the electrodes and an electrical consumer with which the storage cell is associated.

A battery is generally designed to operate under so-called nominal conditions in other words within given temperature, current and voltage ranges. The use of a battery outside of its nominal temperature range, which is typically between 0° C. and 40° C. can bring about a limitation of its performance or premature ageing. For example, the charge performed at a temperature which is too low can result in an insufficiently charged battery and discharging performed at a temperature which is too low can result in a deterioration of battery performance, for example an incapacity to supply heavy currents. French patent FR-A-2,282,735 teaches a method for charging a battery in which the battery is warmed by supply from a heating circuit when its temperature is below a determined value.

Now, some batteries are employed in cold environments in which the mean ambient temperature is below the minimum temperature of the nominal operating range of the battery. Thus, for example, standby power batteries for telecommunications cabinets located externally of buildings can be exposed to temperatures down to −20° C. or lower during the winter. Similarly, certain portable tools can be used in cold environments. Under such temperature conditions, battery performance can be significantly degraded, or even prove insufficient when called on to do service, thereby rendering the batteries nonoperational.

The batteries are generally kept in a charge state by control electronics which monitor their state of charge (SOC), battery charging being commanded from a main power supply in order to guarantee a state of charge (SOC) approaching 100% when the battery is required to be used.

The problem of battery temperature is particularly sensitive in the phases of charge balancing and maintaining charge since, contrary to the charging phase, these phases bring about little warming up of the battery since they employ small currents. In effect, if we designate battery capacity by C, fast charging is typically performed with a current comprised between C/10 and C whereas balancing and trickle charging take place using a current between C/100 and C/20 and, respectively, C/500 and C/100. For example, for a 10 A.h capacity battery, this means that a current comprised between 1 A and 10 A is employed for the charging phase whereas currents comprised between 100 mA and 500 mA and, respectively, 20 mA and 100 mA are employed for the charge balancing and trickle charging phases. During these balancing and trickle charging phases, the current applied to the battery is insufficient to bring about warming of the battery.

It is consequently necessary to provide an electronic system which allows batteries employed in a cold environment to be maintained within their normal temperature range to ensure they operate correctly when required to provide service.

It is known to position a heater around the battery. This is for example what is taught in U.S. Pat. No. 5,281,792. Such a heater is constituted by a resistive system which dissipates heat energy to the battery by the Joule effect. The heater is positioned around the battery in such a way as to ensure good thermal transfer to the battery.

It is also possible to arrange heating elements between the individual cells of the battery. For example, European patent application EP-A-1,261,065 teaches the use of a thermal cover arranged between the battery cells for circulation of, depending on the need, refrigerating or heating liquid.

The heater or heating cover require an external source of energy and require to be controlled by their own thermostatic system or the battery charging system. The use of such a heating system involves adding a component which increases overall cost of the battery.

There is consequently a need for an economic solution which allows batteries to be used in cold environments.

SUMMARY OF THE INVENTION

To achieve this, the invention provides for use of the heat produced by the batteries themselves during charging or overcharging phases. Heating up is proportional to the current applied to the battery and originates from recombination of alkaline electrolyte electrochemical couples such as for example nickel-metal hydride (Ni-MH) or nickel-cadmium (Ni—Cd) couples. The charging circuit can consequently serve to heat up the battery.

More particularly, the invention provides a method for managing the charge of a battery comprising at least one rechargeable electrochemical cell, in which the charging circuit applies:
- a trickle charge current to said battery, and
- an overcharge current when the temperature of said battery is below a first threshold temperature.

In various embodiments, the charge management method of the invention can further comprise one or more of the following features:
- the charging circuit ceases to apply the overcharge current when a temperature of the battery is higher than a second threshold temperature.
- the temperature of the battery corresponds to the lowest temperature measured for each one of the cells of the battery.

The invention further provides an electronic system for a battery comprising at least one rechargeable electrochemical cell, the system comprising:
- a battery temperature sensor,
- a charging circuit adapted to apply a trickle charge current and an overcharge current when a temperature of said battery is below a first threshold temperature, said threshold temperature being higher than ambient temperature.

In various embodiments, the electronic system of the invention can further comprise one or more of the following features:
- the temperature of the battery corresponds to the lowest temperature measured at each one of the cells of the battery.

the overcharge current is interrupted when the temperature of said battery is higher than a second threshold temperature.

The invention further provides a battery comprising:
at least one rechargeable electrochemical cell, and
an electronic system according to the invention.

Depending on the embodiment, the cells can be of the nickel-metal hydride type or of the nickel-cadmium type.

Further characteristics and advantages of the invention will become more clear from reading the description which follows of some embodiments of the invention provided by way of example and with reference to the attached drawings.

DETAILED DESCRIPTION OF PREFERRED EMBODIMENTS

The invention provides a method for battery charge management. The invention provides for keeping a battery within its nominal temperature range even if the battery is employed in a cold environment. To achieve this, the invention provides for using the heat produced by alkaline electrolyte batteries during their charging or overcharging. The charge management method provides for applying an overcharge current in order to increase battery temperature if this temperature is too low. The invention further covers an electronic system for a battery and a battery comprising such system.

Figure 1:
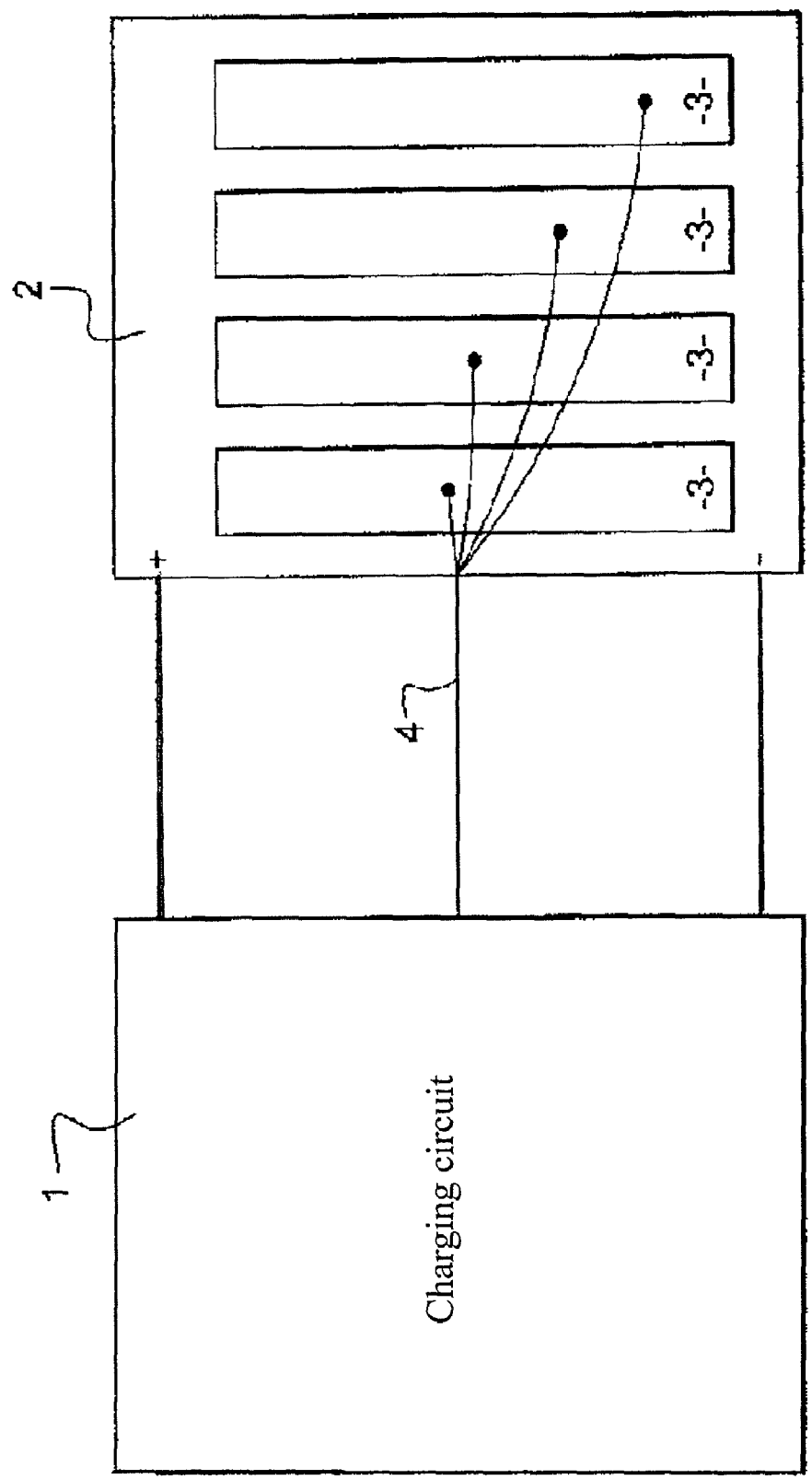
FIG. 1 is a diagrammatic representation of an electronic system according to the invention.

An electronic system according to the invention is described with reference to FIG. 1. This electronic system comprises a charging circuit 1 associated with a battery 2.

Charging circuit 1 can be connected to the main power supply on an application to which battery 2 is designed to supply standby power or can be integrated into or connected to an auxiliary source of current for charging the battery of a portable tool. Charging circuit 1 can thus control application of the charging current or trickle charging of battery 2.

Battery 2 comprises one or more alkaline electrolyte rechargeable cells 3 which may be connected in series or in parallel or in a series/parallel configuration depending on the nominal operating voltage of the consuming device and the amount of energy (amp hours) that it is intended to supply to the consuming device. The cells 3 can be of any shape, in particular prismatic, cylindrical or concentric.

Battery 2 further comprises at least one temperature sensor 4 which supplies a signal that reflects battery temperature, this signal being able to be received and evaluated by an electronic unit associated with charging circuit 1. Temperature sensor 4 can be a thermistor, a silicon-based sensor, a thermocouple or any component allowing temperature information to be obtained. In one embodiment, battery 2 can comprise a plurality of temperature sensors 4 measuring the temperature of each cell 3 of battery 2. The electronic unit associated with charging circuit 1 can then select as the temperature signal for battery 2, the one corresponding to the cell 3 of the lowest temperature.

Sensors measuring voltage and/or current of each cell 3 of battery 2 can also be provided in battery 2 in order to monitor the state of charge of each cell 3 and balance the charge of battery 2.

Charging circuit 1 can be any known charging circuit capable of applying a current to battery 2. Charging circuit 1 is capable of applying high currents to obtain rapid charging during the charging phase together with low currents during the balancing or trickle charging phases.

According to the invention, the electronic unit of charging circuit 1 is adapted to command application of an overcharge current. By "overcharge current" we mean the application of a current to the battery while the state of charge (SOC) of the battery is higher than 95%, or is even 100%.

The method of the invention involves applying to battery 2 an overcharge current when the temperature is lower than a threshold temperature $T_1$ in order to heat it up. Threshold temperature $T_1$ can for example correspond to the minimum temperature of the nominal temperature range of battery 2.

The electronic system of the invention operates as follows. The electronic unit associated with the charging circuit receives a signal that is representative of the temperature of battery 2. The signal originates from one of the temperature sensors 4 of battery 2 or from processing of the various signals originating from the different sensors. The electronic unit then performs a comparison between the temperature of battery 2 and the predefined temperature threshold $T_1$. It is also possible for several signals, each corresponding to the temperature of a cell 3 to be sent to the electronic unit associated with charging circuit 1 for evaluation and comparison with threshold temperature $T_1$; as long as the temperature of one of the cells 3 is below threshold temperature $T_1$, the electronic unit of charging circuit 2 controls the application of an overcharge current.

The mean overcharge current applied can be comprised between C/40 and C/10, in other words higher than the current employed during the balancing and trickle charging phases, but less than the charging current. The overcharge current makes it possible to guarantee sufficient warming up. The overcharge current should be selected as a function of the least favourable case, in other words when there is maximum deviation between ambient temperature and threshold temperature $T_1$. It is in this situation that maximum warming and consequently a high current is necessary. For example, in the case of a 10 A.h battery capacity, the overcharge current can be comprised between 250 mA and 1000 mA. These overcharge current values are only given as an indication as these values depend on the configuration of the battery and the degree of divergence between ambient temperature and threshold temperature $T_1$.

It is however not desirable for battery 2 to operate beyond the maximum temperature of its nominal temperature range. In effect, apart from deterioration in performance of battery 2 when it is used at a temperature that is too low, charging or discharge performed at an excessive temperature can also lead to rapid deterioration of the components of battery 2. In certain cases, thermal runaway of battery 2 or even its explosion can be observed.

Thus, the method and electronic system of the invention provide for the overcharge current to be stopped when the temperature of battery 2 exceeds a second temperature threshold $T_2$ higher than first temperature threshold $T_1$. The second threshold temperature $T_2$ can for example correspond to the minimum value ensuring battery 2 operates correctly augmented by a few degrees. Inside the electronic unit, an operational amplifier used in hysteresis configuration can, of example, be used for performing the comparisons with a first and second threshold temperatures $T_1$ and $T_2$.

When battery 2 is no longer being warmed by application of an overcharge current, the temperature of battery 2 can fall back to below the minimum threshold for correct operation; charging circuit 1 then again applies an overcharge current. The temperature of battery 2 consequently increases and when the temperature again reaches the second threshold temperature $T_2$, the overcharge current is stopped.

Thus, phases during which an overcharge current is applied alternate with phases during which no current is applied. Through this, battery 2 receives a mean overcharge current which is controlled by the battery temperature, to keep battery 2 at a temperature comprised within the nominal temperature range and guarantee correct operation.

Overcharge current application is independent of the currents habitually applied by charging circuit 1 (charging current, balancing current and trickle charging current). Thus, the electronic system of the invention can be just as well employed in a hot environment where overcharge current is only useful in a cold environment. Because of this, the electronic system of the invention is particularly well suited to changing environments, notably where battery 2 is intended to operate outside, both in hot weather as well as in cold weather.

Existing charging circuits can be relatively easily adapted to incorporate the temperature maintaining function for battery 2. This is notably the case with electronic systems that already incorporate a temperature sensor 4 in battery 2 and software-driven charge management. In order to implement the method of the invention, the electronic unit associated with the charger will be programmed with a suitable algorithm for charge management.

This modification to charge management software is achieved without the addition of hardware in an existing electronic system, unlike the solution currently used in the state-of-the-art which does require addition of a resistance system for warming the battery. The invention consequently provides a solution to the use of a battery in cold environments.

In the case of analog charging systems, it can also be envisaged to add such a temperature maintenance function for battery 2 within the nominal range by adding means for driving a current source as a function of temperature of battery 2.

Figure 2:
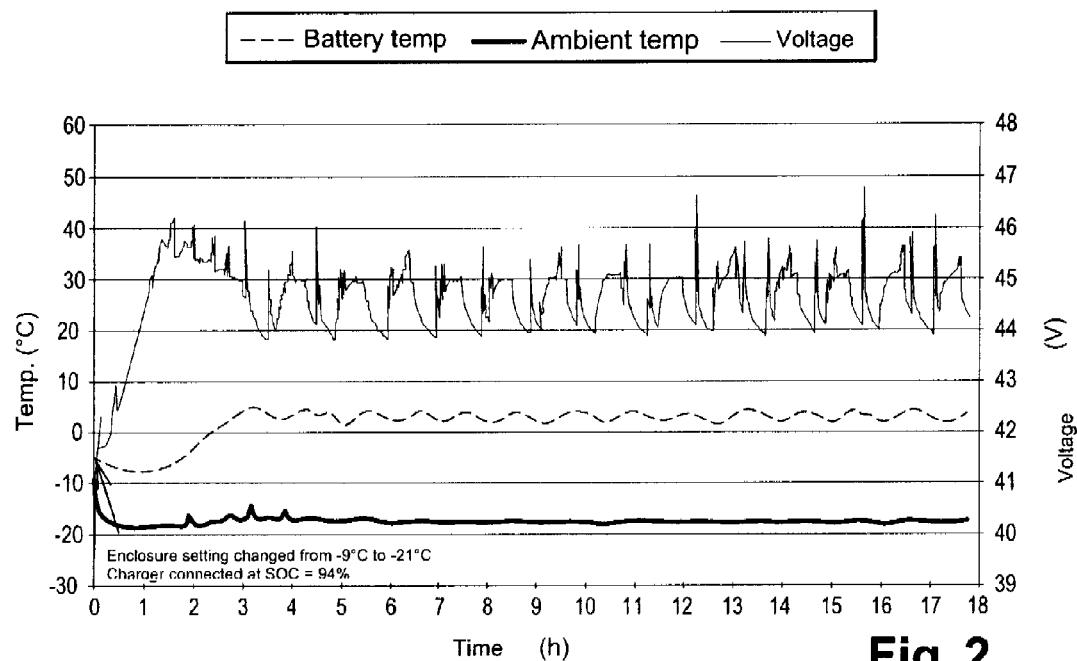
FIG. 2 shows battery temperature variations during a simulation of the method of the invention.

FIG. 2 shows a simulation of the method according to the invention. The battery 2 employed comprises 30 Ni-MH type cells of capacity 9.5 A.h in series. The experimental conditions of the simulation performed were the following. The electronic system was placed in an environmentally-controlled enclosure, for control of ambient temperature. At the moment of starting, the temperature of battery 2 was −5° C. in an enclosure of temperature −9° C. and the state of charge (SOC) of battery 2 was 50%. The enclosure was then suddenly set to about −18° C. How the system performed over time was then studied by measuring the temperature of battery 2, the temperature of the environment and the voltage of battery 2.

The duration of the phases during which overcharge current was applied and stopped depended on the difference in temperature between ambient temperature and the desired minimum temperature for battery 2.

In the simulation of FIG. 2, the difference between ambient temperature and minimum desired temperature for battery 2 is 20° C. This results in overcharge current pulses at C/20 for 30 minutes, followed by 30 minute periods while these are stopped. The mean overcharge current applied in order to maintain the temperature of battery 2 at 3° C. with a +1° C. confidence interval consequently amounts to a mean overcharge current of C/40.

A study of the curves in FIG. 2 consequently shows that piloting a source of current of C/20 keeps battery 2 at about 3° C. in an environment the mean temperature of which is −18° C.

Figure 3:
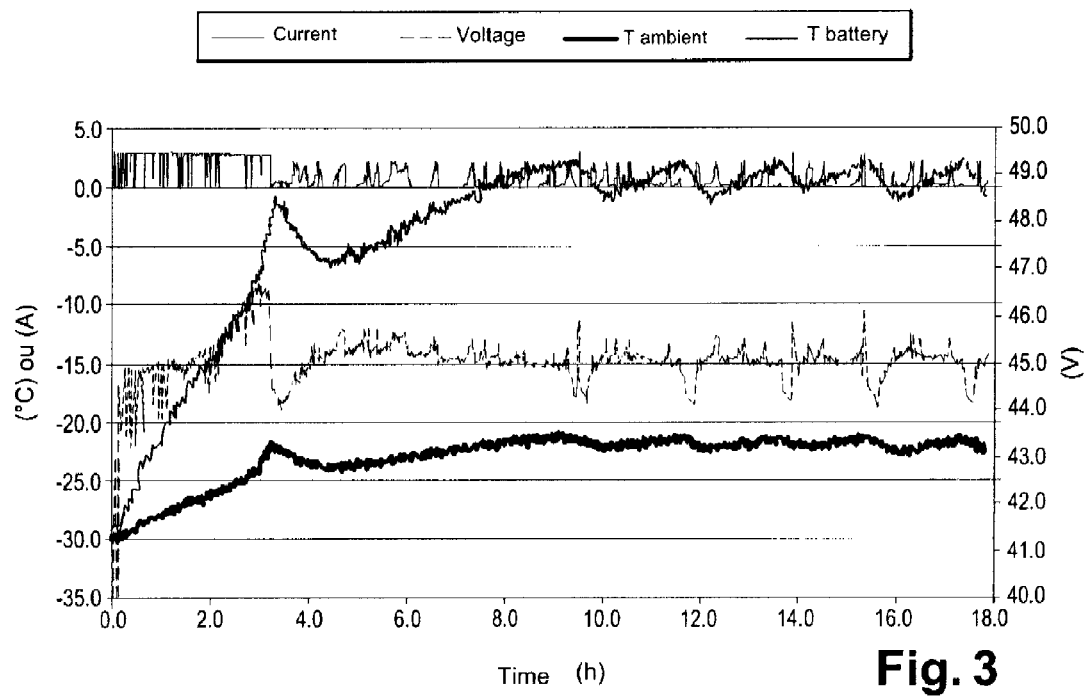
FIG. 3 shows battery temperature variations during a simulation of the method of the invention.
Figure 4:
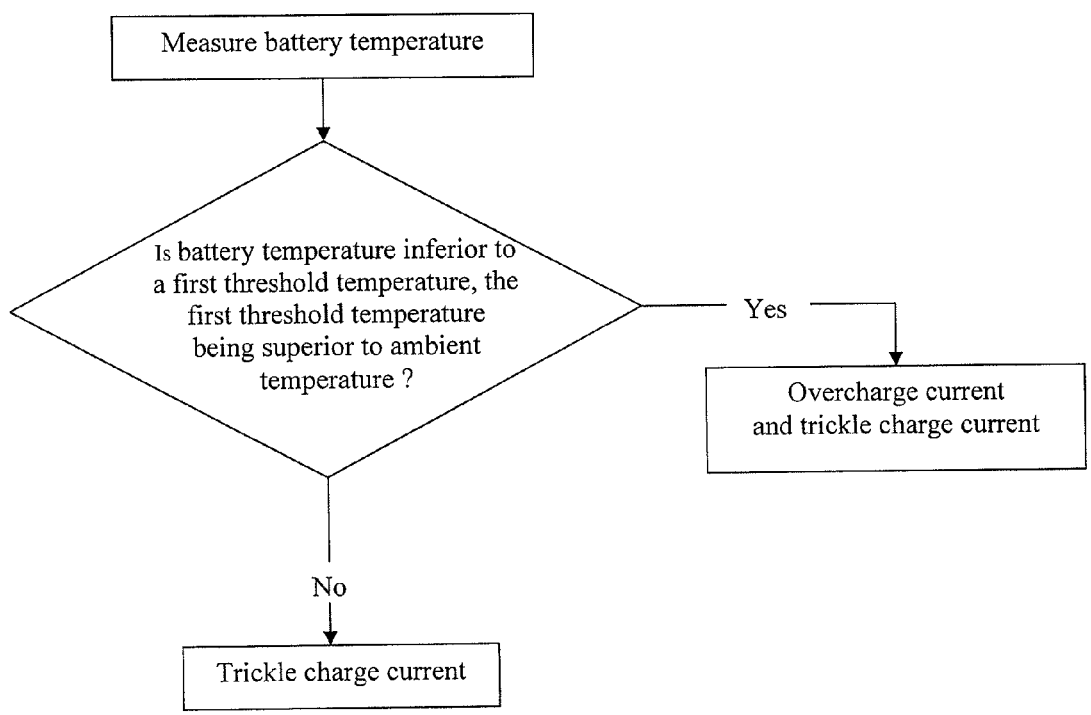
FIG. 4 shows a flowchart of a method for managing the charge of the battery.

The simulation illustrated in FIG. 3 was obtained with the same system as the one employed for the simulation in FIG. 2. The experimental conditions of this second simulation were as follows. The electronic system was still in an environmentally-controlled enclosure in order to control environmental temperature. However, as the enclosure was set to a lower temperature than that in the first simulation, the electronic system was placed in a cardboard box to reduce the effects of forced ventilation of the enclosure.

At the starting point, the temperature of battery 2 was −30° C. in an enclosure at −30° C. and battery 2 was initially discharged. Battery 2 was then charged.

How the system behaved over time was then studied by measuring the temperature of battery 2, the temperature of the environment (ambient temperature was the temperature inside the cardboard box), the voltage of battery 2 as well as the current of battery 2.

During the fast charge phase at C/3, a heating up of battery 2 and of the environment was observed. Following this, battery 2, charged, was maintained at about 0° C. by the electronic system of the invention.

The method and electronic system of the invention consequently allow optimum use of a battery in a cold environment with temperatures which are below the nominal operating temperature.

The invention claimed is:

1. A method for managing the charge of a battery comprising at least one rechargeable electrochemical cell, in which a charging circuit applies:
   a trickle charge current to said battery; and
   an overcharge current when a temperature of said battery is below a first threshold temperature, said threshold temperature being higher than ambient temperature, said ambient temperature being lower than 0° C.

2. The method according to claim 1, in which the charging circuit ceases to apply the overcharge current when the temperature of the battery is higher than a second threshold temperature.

3. The method according to claim 1, in which the temperature of the battery corresponds to the lowest temperature measured for each one of the cells of the battery.

4. An electronic system for a battery comprising at least one rechargeable electrochemical cell, the system comprising:
   a battery temperature sensor; and
   a charging circuit adapted to apply a trickle charge current and an overcharge current when a temperature of said battery is below a first threshold temperature, said threshold temperature being higher than ambient temperature, said ambient temperature being lower than 0° C.

5. The electronic system for a battery according to claim 4, in which the temperature of the battery corresponds to the lowest temperature measured at each one of the cells of the battery.

6. The electronic system for a battery according to claim 4, in which said overcharge current is interrupted when the temperature of said battery is higher than a second threshold temperature.

7. A battery comprising:

at least one rechargeable electrochemical cell; and an electronic system, comprising:

a battery temperature sensor, and a charging circuit adapted to apply a trickle charge current and an overcharge current when a temperature of said battery is below a first threshold temperature, said threshold temperature being higher than ambient temperature, said ambient temperature being lower than 0° C.

8. The battery according to claim 7, in which said cells are of the NiMH type.

9. The battery according to claim 7, in which said cells are of the NiCd type.

10. The battery according to claim 7, in which the temperature of the battery corresponds to the lowest temperature measured at each one of the cells of the battery.

11. The battery according to claim 7, in which said overcharge current is interrupted when the temperature of said battery is higher than a second threshold temperature.

* * * * *